(12) United States Patent
Ghyzel et al.

(10) Patent No.: US 7,847,027 B2
(45) Date of Patent: Dec. 7, 2010

(54) ENCAPSULATED MORDANT PARTICLE DISPERSION AND METHOD OF PREPARING

(75) Inventors: Peter J. Ghyzel, Rochester, NY (US); Joseph F. Bringley, Rochester, NY (US); David J. Giacherio, Rochester, NY (US); Lawrence P. DeMejo, Rochester, NY (US); Terry C. Schultz, Hilton, NY (US); Todd Emrick, South Deerfield, MA (US)

(73) Assignee: Eastman Kodak Company, Rochester, NY (US)

( * ) Notice: Subject to any disclaimer, the term of this patent is extended or adjusted under 35 U.S.C. 154(b) by 741 days.

(21) Appl. No.: 11/617,775

(22) Filed: Dec. 29, 2006

(65) Prior Publication Data

US 2008/0161493 A1 Jul. 3, 2008

(51) Int. Cl.
*C08F 116/06* (2006.01)
*C08F 16/06* (2006.01)
*C08L 51/00* (2006.01)
*C08L 53/00* (2006.01)
*C08L 37/00* (2006.01)

(52) U.S. Cl. .................. 525/154; 525/55; 525/540; 525/902; 525/70; 525/71; 525/74; 525/56; 525/58; 428/407

(58) Field of Classification Search .......... 525/71, 525/76, 77, 70, 74, 56, 55, 540, 902; 430/518; 428/407

See application file for complete search history.

(56) References Cited

U.S. PATENT DOCUMENTS

| | | | |
|---|---|---|---|
| 3,870,663 A * | 3/1975 | Clemens et al. | 521/147 |
| 3,958,995 A * | 5/1976 | Campbell et al. | 430/518 |
| 4,592,960 A * | 6/1986 | Inoue et al. | 428/461 |
| 5,221,713 A * | 6/1993 | Kempner et al. | 525/71 |
| 6,045,917 A | 4/2000 | Missell et al. | |
| 6,057,384 A * | 5/2000 | Nguyen et al. | 523/160 |
| 6,492,006 B1 | 12/2002 | Kapusniak et al. | |
| 6,521,342 B1 * | 2/2003 | Hutter et al. | 428/407 |
| 6,573,313 B2 * | 6/2003 | Li et al. | 523/201 |
| 6,619,797 B2 * | 9/2003 | Lawrence et al. | 347/105 |
| 6,645,582 B2 | 11/2003 | Sadasivan et al. | |
| 6,669,815 B1 | 12/2003 | Sugiyama et al. | |
| 6,767,638 B2 * | 7/2004 | Samaranayake | 428/407 |
| 6,818,685 B1 | 11/2004 | Chapman | |
| 6,969,445 B1 | 11/2005 | Hibino et al. | |
| 2004/0145088 A1 * | 7/2004 | Patel et al. | 264/463 |
| 2005/0031806 A1 | 2/2005 | Kim et al. | |

FOREIGN PATENT DOCUMENTS

| | | | |
|---|---|---|---|
| EP | 1035179 | * | 9/2000 |
| JP | 2006089696 | * | 4/2006 |
| WO | WO 2005118653 | * | 12/2005 |

* cited by examiner

*Primary Examiner*—Vasu Jagannathan
*Assistant Examiner*—Irina Krylova
(74) *Attorney, Agent, or Firm*—Chris P. Konkol; Andrew J. Anderson

(57) ABSTRACT

The present invention discloses a method of making core-shell polymer particles, comprising forming a linking-group-containing polymer by derivatizing a hydroxy-group-containing polymer, comprising hydroxy groups on adjacent carbon atoms with a linking agent, that is a compound comprising both an aldehyde moiety and an amine moiety, wherein one or more acetal moieties are formed in the linking-group-containing polymer, each acetal formed by the reaction of the aldehyde moiety in the linking agent with two hydroxy groups in the linking-group-containing polymer, wherein the amine moiety then becomes a linking group pendent from the linking-group-containing polymer, wherein the linking group is capable of reacting with a precursor group in the precursor polymer. Also disclosed are compositions comprising insoluble core-shell particles made by the method.

24 Claims, No Drawings

ENCAPSULATED MORDANT PARTICLE DISPERSION AND METHOD OF PREPARING

CROSS REFERENCE TO RELATED APPLICATIONS

Reference is made to commonly assigned, co-pending US Publication No. 2008/0160228, filed of even date herewith, and entitled "Image Recording Element Comprising Encapsulated Mordant Particles."

FIELD OF THE INVENTION

This invention relates to encapsulated polymer particles and methods for making such particles. More particularly, this invention relates to water dispersible core-shell polymer particles comprising an advantageous means of attaching shell material to core material in the particles.

BACKGROUND OF THE INVENTION

Polymer particles containing cationic groups, for example, for use as mordants in an image-receiving layer of inkjet recording elements, in order to mordant dye-based inks are generally well known in the art. U.S. Pat. Nos. 6,045,917 and 6,645,582, for example, disclose water-insoluble cationic polymeric particles having at least about 20 mole percent of a cationic mordant moiety. Preferred mordants comprising a polymer having a vinylbenzyl trimethyl quaternary ammonium salt moiety are disclosed. U.S. Pat. No. 6,645,582 states that such particles can be core/shell particles wherein the core is organic or inorganic and the shell in either case is a cationic polymer (page 3, lines 44 to 58).

U.S. Pat. No. 6,619,797 discloses an image-receiving layer comprising a cationic core/shell particle prepared by emulsion polymerization containing at least one ethylenically unsaturated monomer containing a trialkylammonium salt. However, the shell, but not the core, contains the trialkylammonium group.

U.S. Pat. No. 6,492,006 discloses an inkjet recording element comprising a support having thereon an image receiving layer comprising at least about 70% by weight of porous polymeric particles, the particles having a core/shell structure comprising a porous polymeric core covered with a shell of a water-soluble polymer. The core-shell particles are formed by emulsion polymerization of the core monomers in the presence of the shell polymer. The recording element exhibited less cracking, but no improvement in dye density was disclosed. The porous polymeric particles do not have a monomer with cationic functionality, thus do not function as mordant.

US 2005/0031806 discloses a composition for forming an ink accepting layer comprising a structured cationic core/shell latex (TruDot DPX, Westvaaco), wherein a non-porous core does not have a cationic functional group and does not expand, and the shell contains a cationic functional group capable of expansion by an acid. The recording element exhibited improved absorption and water-fastness, but no improvement in dye fade was disclosed.

U.S. Pat. No. 6,818,685 discloses a coating composition comprising a non-ionic latex polymer (polyvinyl acetate), wherein the polyvinyl acetate has a core and a shell, and the shell comprises poly(vinyl alcohol). The particle core has no positive ionic character. A composition of high solids and low viscosity was disclosed and the recording element exhibited reduced dusting, but no improvement in dye fade was disclosed.

U.S. Pat. No. 6,969,445 and U.S. Pat. No. 6,669,815 describe graft copolymers of poly(vinyl alcohol) with cationic polymers.

Other uses for cationic core-shell particles are known. For example, such particles are useful in ink compositions. Another area of use for such particles is in paints and other coatings. Still another area of use is in drug delivery, for example, delayed release drug delivery. Still other uses include toughening agents for polycarbonates (El-Aasser et al. Macromol. Symp. 101, 517-529, 1996) and epoxies (Qian et al. Polymer Volume 38, Number 1, 1997).

SUMMARY OF THE INVENTION

It is an object of this invention to provide improved core-shell particles for various applications, including mordants, porous media, protective overcoats, and other known uses for core-shell materials.

These and other objectives of the present invention are accomplished by a method of making a core-shell polymer comprising the following steps:

(a) forming a precursor polymer from a reaction mixture of monomers, including a monomer comprising a precursor group that can be converted to a quaternary ammonium group such as an alkyl chloride group;

(b) forming a linking-group-containing polymer by derivatizing a hydroxy-group-containing polymer comprising hydroxy groups on adjacent carbon atoms, for example, poly (vinyl alcohol) or the like, with a linking agent that is a compound comprising both an aldehyde moiety and an amine moiety, wherein one or more acetal moieties are formed in the linking-group-containing polymer, each acetal formed by the reaction of the aldehyde moiety in the linking agent with two hydroxy groups in the linking-group-containing polymer, wherein the amine moiety then becomes a linking group pendent from the linking-group-containing polymer, wherein the linking group is capable of reacting with said precursor group in the precursor polymer; and (c) reacting the amine moiety in the linking-group-containing polymer with the precursor group in the precursor polymer to form a higher order amine or quaternized ammonium salt moiety connecting the linking-group coating polymer to the precursor polymer, thereby creating a core-shell particle which may optionally comprise unreacted precursor groups, wherein a first of said two polymers, either the precursor polymer or the linking group-containing polymer, is a latex comprising a water insoluble polymer, wherein the latex forms a core for the core-shell particle and the second of said two polymers forms a shell.

In one embodiment, the precursor polymer forms the core of the insoluble core-shell polymeric particle and the linking group-containing polymer forms the shell, such that at least the core polymer is cationic. The linking group containing polymer can optionally comprise cationic groups such that both the core and the shell are cationic.

Conversely, in an alternate embodiment, the precursor polymer forms the shell of the insoluble core-shell polymeric particle and the linking group-containing polymer forms the core, such that at least the shell polymer is cationic. Optionally, in this case, the linking group containing polymer comprises cationic groups such that both the core and the shell are cationic.

In one preferred embodiment, after step (c), the core-shell particle is reacted with a tertiary amine compound, not a polymer, to obtain quaternization of unreacted precursor groups in the precursor polymer in the core-shell particle, thereby forming insoluble cationic core-shell polymeric particles comprising quaternary ammonium groups having net cationic charge.

Another aspect of the invention relates to a composition comprising insoluble core-shell polymeric particles, each comprising a core and shell, a core comprising crosslinked core polymer and a shell comprising hydrophilic shell polymer, wherein the shell is at least 10% by weight of the core, wherein the shell polymer is linked to the core polymer through a linking group between the core polymer and shell polymer comprising an amine group relatively closer to the core and an acetal group relatively closer to the shell.

In one preferred embodiment, the composition comprises insoluble cationic core-shell polymeric particles each comprising a core and shell, a core comprising insoluble crosslinked cationic core polymer having at least 10 mole percent of a cationic mordant monomeric unit and a shell comprising hydrophilic shell polymer that is substantially less cationic than the insoluble swellable crosslinked cationic core polymer, wherein the shell is at least 10% by weight of the core.

In one preferred embodiment, the hydrophilic shell polymer is at least 50 percent less cationic than the insoluble swellable crosslinked cationic core, in terms of number of cationic groups per weight average molecular weight of the polymer, and more preferably the hydrophilic outer shell polymer is essentially non-ionic and non-cationic.

Particle sizes referred to herein, unless otherwise indicated, are median particle sizes as determined by light scattering measurements of diluted particles dispersed in water, as measured using photon correlation spectroscopy (PCS) or MIE scattering techniques employing a NANOTRAC (Microtac Inc) ultrafine particle analyzer or a Horiba LA-920 instrument, respectively.

As used herein, the terms "over," "above," "upper," "under," "below," "lower," and the like, with respect to layers in inkjet media, refer to the order of the layers over the support, but do not necessarily indicate that the layers are immediately adjacent or that there are no intervening layers.

In regard to one application of the present particles, the term "image-receiving layer" is intended to define a layer that can be used as a dye-trapping layer, or dye-and-pigment-trapping layer, in which the printed image substantially resides throughout the layer. Preferably, an image-receiving layer comprises a mordant for dye-based inks. The image may optionally reside in more than one image-receiving layer. In contrast, the term "sump layer" or "ink-carrier-liquid receptive layer" is used herein to mean a layer, under the upper image-receiving layer, that absorbs a substantial amount of ink-carrier liquid. In use, a substantial amount, preferably most, of the carrier fluid for the ink is received in the one or more ink-carrier-liquid receptive layers. The term "ink-receptive layer" or "ink-retaining layer" includes any and all layers above the support that are receptive to an applied ink composition that absorb or trap any part of the one or more ink compositions used to form the image in the inkjet recording element, including the ink-carrier fluid and/or the colorant, even if the former is removed by drying. An ink-receptive layer, therefore, can include an image-receiving layer, in which the image is formed by a dye and/or pigment, a porous ink-carrier-liquid receptive layer, or any additional layers, for example between a porous underlying layer and a topmost layer of the inkjet recording element. Typically, all layers above the support are ink-receptive. The support on which ink-receptive layers are coated may also absorb ink-carrier fluid, in which it is referred to as an ink-absorptive or absorbent layer rather than an ink-receptive layer.

The term "non-ionic" is defined herewith as a polymer having essentially no cationic or anionic groups in salt form, less than 1 mole percent in terms of monomer content.

The term "swellable" is defined herewith as the crosslinking is less than 10 mole percent, preferably less than 3 mole percent, and the particle is dispersible in water.

DETAILED DESCRIPTION OF THE INVENTION

The present invention relates to a core-shell structure having a protective shell or barrier, in which the core comprises insoluble latex, which core is encapsulated or surrounded by a protective shell. The core and the shell are independently neutral, anionic, or cationic in net charge. In a preferred embodiment, either one of the core or the shell is cationic in net charge and the other one of the core and shell is essentially neutral, meaning that ionic species comprise less than one mole percent of the polymer's repeating units.

Preferably, a crosslinking monomer is present in the core in an amount of 0.5 to 15 mole percent, preferably 1 to 10 mole percent.

In one particular embodiment for example, the insoluble cationic core-shell polymeric particles each comprising a core and shell, a core comprising insoluble swellable crosslinked cationic core polymer having at least 10 mole percent, preferably at least 20 mole percent, more preferably 35 to 99 mole percent, of a cationic mordant monomeric unit, most preferably greater than 50 mole percent.

The precursor polymers can be products of addition or condensation polymerization, or a combination of both. They can be branched, hyper-branched, grafted, random, blocked, crosslinked, or can have other polymer microstructures well known to those in the art. In one particular embodiment, the core in the water-insoluble core-shell polymeric particles comprises at least about 50 mole percent of a cationic mordant moiety. In the precursor polymer used to make the particles, precursor groups may be present that are later converted to cationic mordant moieties.

The core in the water-insoluble core-shell polymeric particles useful in the invention can comprise a precursor polymer comprising nonionic or anionic monomeric units in addition to cationic monomeric units. In a preferred embodiment, combinations of nonionic and cationic or anionic monomeric units are employed.

The nonionic, anionic, or cationic monomeric units employed in the core of the water-insoluble cationic core-shell polymeric particles can include neutral, anionic or cationic derivatives of addition polymerizable monomers such as styrenes, alpha-alkylstyrenes, acrylate esters derived from alcohols or phenols, methacrylate esters, vinylimidazoles, vinylpyridines, vinylpyrrolidinones, acrylamides, methacrylamides, vinyl esters derived from straight chain and branched acids (e.g., vinyl acetate), vinyl ethers (e.g., vinyl methyl ether), vinyl nitrites, vinyl ketones, halogen-containing monomers such as vinyl chloride, and olefins, such as butadiene.

The nonionic, anionic, or cationic monomeric units employed can also include neutral, anionic or cationic derivatives of condensation polymerizable monomers such as those used to prepare polyesters, polyethers, polycarbonates, polyureas and polyurethanes.

The precursor polymer for the water-insoluble cationic core-shell polymeric particles employed in this invention can be prepared using conventional polymerization techniques including, but not limited to bulk, solution, emulsion, or suspension polymerization. In a preferred embodiment of the invention, the core of the water-insoluble particles have a mean particle size of from about 10 to about 500 nm.

Emulsion polymerization is a heterogeneous, free-radical-initiated chain polymerization in which a monomer or a mixture of monomers is polymerized in the presence of an aqueous solution of a surfactant to form a latex, which is a colloidal dispersion of polymer particles in an aqueous medium. Emulsion polymerization is well known in the art and is described, for example, in F. A. Bovey, *Emulsion Polymerization*, issued by Interscience Publishers Inc. New York, 1955, and P. A. Lovell and M. El-Aasser, *Emulsion Polymerization and Emulsion Polymers*, issued by John Wiley and Sons, Chichester, 1997.

The basic components of an emulsion polymerization include water, initiators, surfactants, monomers, and optional additives and addenda such as chain transfer agents, biocides, colorants, antioxidants, buffers, and rheological modifiers. Emulsion polymerizations can be carried out via a batch process, in which all of the components are present at the beginning of the reaction, a semibatch process, in which one or more of the ingredients is added continuously, or a continuous process, in which the ingredients are fed into a stirred tank or more than one tank in series and the product latex is continuously removed. Intermittent or "shot" addition of monomers may also be used.

The monomers useful in an emulsion polymerization will include 75-100% of water-immiscible monomers and 0-25% of water-miscible monomers. Water-immiscible monomers useful in this embodiment of this invention include methacrylic acid esters, such as methyl methacrylate, ethyl methacrylate, isobutyl methacrylate, 2-ethylhexyl methacrylate, benzyl methacrylate, phenoxyethyl methacrylate, cyclohexyl methacrylate and glycidyl methacrylate, acrylate esters such as methyl acrylate, ethyl acrylate, isobutyl acrylate, 2-ethylhexyl acrylate, benzyl methacrylate, phenoxyethyl acrylate, cyclohexyl acrylate, and glycidyl acrylate, styrenics such as styrene, α-methylstyrene, 3- and 4-chloromethylstyrene, halogen-substituted styrenes, and alkyl-substituted styrenes, vinyl halides and vinylidene halides, N-alkylated acrylamides and methacrylamides, vinyl esters such as vinyl acetate and vinyl benzoate, vinyl ether, allyl alcohol and its ethers and esters, and unsaturated ketones and aldehydes such as acrolein and methyl vinyl ketone, isoprene, butadiene and cyanoacrylate esters. In addition, any of the acrylate, styrenics, and crosslinking monomers listed previously in this document which are water-insoluble can be used.

Water-miscible monomers are useful in the present invention. Such monomers include the charged monomers which contain ionic groups as discussed previously. Other useful monomers include monomers containing hydrophilic, non-ionic units such as poly(ethylene oxide) segments, carbohydrates, amines, amides, alcohols, polyols, nitrogen-containing heterocycles, and oligopeptides. Examples of nonionic, water-miscible monomers include, but are not limited to poly(ethylene oxide)acrylate and methacrylate esters, vinylpyridines, hydroxyethyl acrylate, glycerol acrylate and methacrylate esters, (meth)acrylamide, and N-vinylpyrrolidone.

Initiators which are useful in this embodiment of this invention include both water-soluble and water-insoluble initiators, although the former class is preferred. These include, but are not restricted to azo compounds, such as 2,2'-azobis(4-methoxy-2,4-dimethylvaleronitrile), (1-phenylethyl)azodiphenylmethane, 2-2'-azoisobutyronitrile (AIBN), 1,1'-azobis(1-cyclohexanedicarbonitrile), 4,4'-azobis(4-cyanovaleric acid), and 2,2'-azobis(2-amidinopropane)dihydrochloride, organic peroxides, organic hydroperoxides, peresters, and peracids such as benzoyl peroxide, lauryl peroxide, capryl peroxide, acetyl peroxide, t-butyl hydroperoxide, t-butyl perbenzoate, cumyl hydroperoxide, peracetic acid, 2,5-dimethyl-2,5-di(peroxybenzoate), and p-chlorobenzoyl peroxide, persulfate salts such as potassium, sodium and ammonium persulfate, disulfides, tetrazenes, and redox initiator systems such as $H_2O_2/Fe^{2+}$, persulfate/bisulfite, oxalic acid/$Mn^{3+}$, thiourea/$Fe^{3+}$, and benzoyl perozide/dimethylaniline. Preferred initiators for this embodiment of this invention include persulfate salts (optionally used in combination with bisulfite), 4,4'-azobis(4-cyanovaleric acid), and 2,2'-azobis(2-amidinopropane)dihydrochloride.

Emulsion polymerizations additionally require a stabilizer compound which is used to impart colloidal stability to the resultant latex particles. These compounds may be surfactants or protective colloids, which are oligomeric or macromolecular amphiphiles. There exists a tremendous number of other known surfactant compounds. Good reference sources for surfactants are the *Surfactant Handbook* (GPO: Washington, D.C., 1971) and *McCutcheon's Emulsifiers and Detergents* (Manufacturing Confectioner Publishing Company: Glen Rock, 1992). Surfactants can be anionic, cationic, zwitterionic, neutral, low molecular weight, macromolecular, synthetic, or extracted or derived from natural sources. Some examples include, but are not necessarily limited to: sodium dodecylsulfate, sodium dodecylbenzenesulfonate, sulfosuccinate esters, such as those sold under the AEROSOL trade name, fluorosurfactants, such as those sold under the ZONYL and FLUORAD trade names, ethoxylated alkylphenols, such as TRITON X-100 and TRITON X-705, ethoxylated alkylphenol sulfates, such as RHODAPEX CO-436, phosphate ester surfactants such as GAFAC RE-90, hexadecyltrimethylammonium bromide, polyoxyethylenated long-chain amines and their quaternized derivatives, ethoxylated silicones, alkanolamine condensates, polyethylene oxide-co-polypropylene oxide block copolymers, such as those sold under the PLURONIC and TECTRONIC trade names, N-alkylbetaines, N-alkyl amine oxides, and fluorocarbon-poly(ethylene oxide) block surfactants, such as FLUORAD FC-430. Protective colloids useful in this invention include, but are not necessarily limited to: poly(ethylene oxide), hydroxyethyl cellulose, poly(vinyl alcohol), poly(vinyl pyrrolidone), polyacrylamides, polymethacrylamides, sulfonated polystyrenes, alginates, carboxy methyl cellulose, polymers and copolymers of dimethylaminoethyl methacrylate, water soluble complex resinous amine condensation products of ethylene oxide, urea and formaldehyde, polyethyleneimine, casein, gelatin, albumin, gluten and xanthan gum.

Preparation by suspension, mini-emulsion or micro-suspension polymerizations. The terms "mini-emulsion" and "micro-suspension" will be used interchangeably throughout this document because they describe processes which are arguably identical. "Suspension polymerization" refers to a process in which a polymerizable liquid is dispersed as droplets in a continuous aqueous medium and polymerized under continuous agitation. Any of the initiators described above for emulsion polymerization can be used in suspension, and mini-emulsion/micro-suspension polymerizations. Preferably, organic-soluble initiators will be used. Normally, this process is carried out in the presence of a "granulating agent," such as a lyophilic polymer (starch, natural gums, polyvinyl alcohol or the like) or an insoluble fine powder such as calcium phosphate. These granulating agents help to obtain a dispersion of droplets of the polymerizable liquid but do not provide sufficient stabilization of the dispersion so that the dispersed droplets are stable in the absence of agitation. Therefore, in this method, it is necessary to carry out the polymerization under continuous high-energy mechanical agitation, since otherwise extensive coalescence of the droplets will occur, with separation of a bulk phase of the water immiscible, polymerizable material or the formation of large amounts of coagulum. Because this process depends on the details of the shear field in the reactor, and on the changing viscosity of the polymerizing dispersed phase, it is difficult to control reproducibly, it is not readily scalable, and gives broad particle size distributions. (PSDs). Suspension polymerization is further described in U.S. Pat. Nos. 5,889,285; 5,274,057; 4,601,968; 4,592,990; R. Arshady "Suspension, emulsion, and dispersion polymerization: A methodological survey" *Colloid Polym. Sci.* 270: 717-732 (1992); and H. G. Yuan, G. Kalfas, W. H Ray *JMS-Rev. Macromol. Chem. Phys.* C31 (2-3): 215 (1991).

The term mini-emulsion or micro-suspension polymerization also refers to a process in which the water-immiscible polymerizable liquid is dispersed in an aqueous medium. In this process, as in suspension polymerization, the water insoluble monomer is dispersed in the presence of a dispersion stabilizer or granulating agent to the desired size by using a mechanical shearing device such as an agitator, a high pressure homogenizer, colloid mill, ultrasonic horn or the like. In contrast to simple suspension polymerization, however, in mini-emulsion or micro-suspension polymerization, the polymerization can then be carried out with no or minimal stirring (only enough to prevent creaming and provide good thermal transfer). Various dispersion stabilizers or granulating agents are well-known in the art (for example, surfactants such as sodium dodecyl sulfate or sodium dioctylsulfosuccinate, and hydrophilic polymers, for example polyvinyl alcohol, gelatin, methyl cellulose, methylhydroxypropyl cellulose, ethyl cellulose, sodium salt of carboxymethyl cellulose, polyacrylic acid and salts thereof, starch, gum, alginic acid salts, zein, casein). In some cases, granulating agents useful for suspension polymerization are also useful for microsuspension polymerization. Which process occurs is a function of the nature of the oil phase, that is, whether the dispersion is stable in the absence of mechanical agitation or whether it will coalesce before or during the polymerization process. Suspension polymerization is used to provide easily filterable polymer products, but these products are generally of ill-defined particle size and size distribution, usually of between 50-1000 micrometers. Mini-emulsion and micro-suspension polymerization can be used to provide products with mean particle sizes less than 20 micrometers. Mini-emulsion and micro-suspension polymerization are described in U.S. Pat. Nos. 5,858,634; 5,492,960; J. Ugelstad, M. S. El-Aasser and J. W. Vanderhoff, *J. Poly. Sci. Polym. Lett. Ed.*, 11, 503 (1973); and Sudol, E. D. and El-Aasser, M. in *Emulsion Polymerization and Emulsion Polymers*, Lovell, P. A. and El-Aaser, M. Eds., John Wiley and Sons Ltd., New York, 1997, p. 699-721.

The water dispersible polymer particle may be made by a dispersion polymerization. Dispersion polymerization is a technique in which a monomer or a monomer mixture is polymerized in a solvent or solvent mixture which is a solvent for the monomer and a non-solvent for the polymer. A stabilizer compound is used to produce a colloidally stable dispersion. A discussion of this type of polymerization is given by J. L. Cawse in *Emulsion Polymerization and Emulsion Polymers*, Lovell, P. A. and El-Aaser, M. Eds., John Wiley and Sons Ltd., New York, 1997, p. 699-721. It is known in the art that steric (nonionic) stabilizers are especially important in this type of polymerization.

The water dispersible polymer particle may be made by solvent evaporation. This involves first forming a solution of a polymer in a solvent that is immiscible with water (along with any required addenda), and then suspending the polymer-solvent solution in water containing a hydrophobically capped oligomeric acrylamide dispersant. The resulting suspension is subjected to high shear action to reduce the size of the polymer-solvent droplets. The shearing action is optionally removed and the polymer-solvent droplets coalesce to the extent allowed by the dispersant to form coalesced polymer-solvent droplets. The solvent is removed from the drops to form solidified polymer particles which are then optionally isolated from the suspension by filtration or other suitable means.

Any suitable solvent that will dissolve the polymer and which is also immiscible with water may be used, such as for example, chloromethane, dichloromethane, ethyl acetate, n-propyl acetate, iso-propyl acetate, vinyl chloride, methyl ethyl ketone (MEK), trichloromethane, carbon tetrachloride, ethylene chloride, trichloroethane, toluene, xylene, cyclohexanone, 2-nitropropane and the like. Preferred are n-propyl acetate, iso-propyl acetate, ethyl acetate and methylene chloride. Particularly preferred is n-propyl acetate or ethyl acetate.

In a preferred embodiment of the invention, the precursor polymer forms the core of the water-insoluble core-shell polymeric particles and forms a cationic polymer having a quaternary ammonium salt moiety. In yet another preferred embodiment, such a core in the water-insoluble core-shell polymeric particles contains a polymer having a (vinylbenzyl)trimethyl ammonium salt moiety. In yet still another preferred embodiment, the core contains a polymer having a (vinylbenzyl)dialkyl benzyl quaternary ammonium salt moiety and/or the core comprises a mixture of a latex containing a polymer having a (vinylbenzyl)trialkyl quaternary ammonium salt moiety and a polymer having a (vinylbenzyl)diakylbenzyl quaternary ammonium salt moiety. Preferred alkyl groups contain 1 to 6 carbon atoms, more preferably methyl or ethyl.

In a preferred embodiment, the precursor polymer in the water-insoluble core-shell polymeric particles can be represented by the following structure:

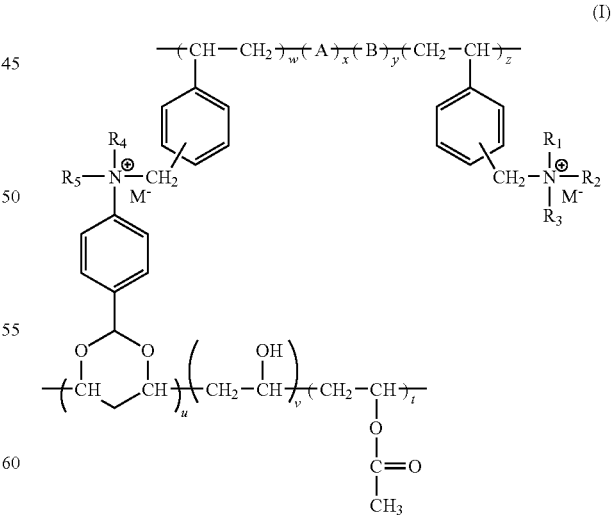

wherein:

A represents units of an addition polymerizable monomer containing at least two ethylenically unsaturated groups;

B represents units of a copolymerizable, α,β-ethylenically unsaturated monomer;

N is the nitrogen in a quaternary amine;

$R_1$, $R_2$, $R_3$, $R_4$, and $R_5$ each independently represents a carbocyclic or alkyl group, wherein the precursor polymer forms an attachment to the shell polymer via the oxygens in the linking group;

$M^-$ is an anion;

x is from about 0.25 to about 15 mole percent;

y is from about 0 to about 90 mole percent;

z is from about 10 to about 99 mole percent;

w is from 0.5 to 5 mole percent;

u is preferably on average 1 to 3 per shell polymer;

v is preferably greater than 75 mole percent for poly(vinyl alcohol); and t is preferably less than 25 mole percent of the poly(vinyl alcohol).

Suitable monomers from which the repeating units of A are formed include divinylbenzene, allyl acrylate, allyl methacrylate, N-allylmethacrylamide, ethylene glycol dimethacrylate, etc.

B in the above formula is a unit of a copolymerizable α,β-ethylenically unsaturated monomer, such as ethylene, propylene, 1-butene, isobutene, 2-methylplentene, etc. A preferred class of ethylenically unsaturated monomers which may be used include the lower 1-alkenes having from 1 to about 6 carbon atoms; styrene, and tetramethylbutadiene and methyl methacrylate.

$R_1$, $R_2$, $R_3$, $R_4$, and $R_5$ in the above formula each independently represents a carbocyclic group such as aryl, aralkyl, and cycloalkyl such as benzyl, phenyl, p-methyl-benzyl, cyclopentyl, etc.; or an alkyl group preferably containing from 1 to about 20 carbon atoms such as methyl, ethyl, propyl, isobutyl, pentyl, hexyl, heptyl, decyl, etc. In a preferred embodiment, $R_1$, $R_2$, $R_3$, $R_4$ and $R_5$ are methyl.

$M^-$ in the above formula is an anion, i.e., a negatively charged ionic radical or atom such as a halide, e.g., bromide or chloride, sulfate, alkyl sulfate, alkane or arene sulfonate, acetate, phosphate, etc.

Further examples of precursor polymers in the water-insoluble core-shell polymeric particles are analogous to the mordant polymers found in U.S. Pat. No. 3,958,995, the disclosure of which is hereby incorporated by reference, except chemically bonded to shell polymers as disclosed herein. Specific examples of these precursor polymers, except for the one or more ammonium groups replaced by linking groups, for example, include:

Polymer A. Copolymer of (vinylbenzyl)trimethylammonium chloride and divinylbenzene (87:13 molar ratio)

Polymer B. Terpolymer of styrene, (vinylbenzyl)dimethylbenzylamine and divinylbenzene (49.5:49.5:1.0 molar ratio)

Polymer C. Terpolymer of butyl acrylate, 2-aminoethylmethacrylate hydrochloride and hydroxyethylmethacrylate (50:20:30 molar ratio)

Polymer D. Copolymer of styrene, dimethylacrylamide, vinylbenzylimidazole and 1-vinylbenzyl-3-hydroxyethylimidazolium chloride 40:30:10:20 molar ratio)

Polymer E. Copolymer of styrene, 4-vinylpyridine and N-(2-hydroxyethyl)-4-vinylpyridinium chloride (30:38:32 molar ratio)

Polymer F. Copolymer of styrene, (vinylbenzyl)dimethyloctylammonium chloride), isobutoxymethyl acrylamide and divinylbenzene (40:20:34:6 molar ratio)

The linking-group-containing polymer comprises polymer having hydroxy groups, which are relatively polar and, hence, exhibit low compatibility for oxygen transmission. Examples include poly(vinyl alcohol) and derivatives and copolymers thereof, such as carboxylated, acetoacetylated, sulfonated and quaternary amine derivatized grades and copolymers of poly(vinyl alcohol) and poly(ethylene oxide). These materials are commercially available from Nippon Gohsei.

As indicated above, in a preferred embodiment, the shell of the core-shell particle preferably comprises the linking-group-containing polymer, preferably a polymer that is substantially less cationic than the insoluble swellable crosslinked cationic precursor polymer. Preferably, the hydrophilic outer linking-group-containing polymer is at least 50 percent less cationic than the insoluble swellable crosslinked cationic core, in terms of number of cationic groups per weight average molecular weight of the polymer. More preferably, the cationic groups are essentially absent from the hydrophilic outer linking-group-containing polymer. The shell is at least 10% by weight of the core, preferably 50 to 400 percent by weight.

For use in mordants, the linking-group-containing polymer preferably is selected to have a $p(O_2)$ (oxygen permeability) of less than 25 cm³●μm/m²●day●KPa, preferably less than 3, more preferably less than 1.0, most preferably ranging from 0.01 to 0.30 cm³●μm/m²●day●KPa. Such values are available in standard reference books, for example, *Brandup and Immergut Polymer Handbook* 3d Edition. Since oxygen is a relatively non-polar molecule, non-polymer polymers such as olefins and acrylates or methacrylate in which the alkyl groups are not substituted with polar groups, for example, such polymers as polypropylene, polyethylene or poly(methyl methacrylate)homopolymer provide a relatively high rate of oxygen transmission and, therefore, is not an effective barrier. However, the properties of the linking-group polymer will depend on its context of use, for example, the function of the shell, whether for ozone protection or slow release of a drug, etc.

Preferably, the linking-group-containing polymer has on average a relatively small number of reaction functionalities, preferably less than three per linking-group-containing polymer, preferable one to two on average. The linking-group-containing polymer can have one or more reactive linking groups along its length.

In one embodiment, a polyvinyl alcohol molecule with a reactive linking group is prepared by derivatizing a commercially available PVA with a molecule containing both aldehyde and tertiary amine functionalities such as p-dimethylaminobenzaldehyde. The aldehyde will react with the polyvinyl alcohol and create an acetal ring group that attaches the compound to the PVA. The tertiary amine group is available to bond the PVA to the precursor polymer. The linking-group-containing polymer can be added to a precursor polymer or intermediate thereof, in a reactive environment, to produce the core-shell mordant or intermediate thereof. The reactive linking group is designed to react with complementary reactive sites in the core polymer or intermediate thereof.

In one preferred embodiment of the present invention, the core-shell particle is made by a process comprising the following steps:

(A) forming a polymer latex core intermediate from a reaction mixture of monomers, including a monomer comprising a precursor group that can be converted to a quaternary ammonium group;

(B) forming a linking-group-containing polymer by derivatizing a hydroxy-group-containing polymer with a linking agent that is a compound comprising both an aldehyde moiety and an amine moiety, wherein one or more acetal moieties are formed in the linking-group-containing polymer, each acetal formed by the reaction of the aldehyde moiety in the linking agent with two hydroxy groups in the linking-group-containing polymer, wherein the amine moiety then becomes a linking group pendent from the linking-group-containing polymer, wherein the linking group is capable of reacting with said precursor group in the polymer latex core intermediate;

(C) reacting the linking-group-containing polymer with the polymer latex core intermediate prior to quaternization of the precursor group (for example, with a trialkylamine, trimethylamine) to create a core-shell particle intermediate; and (D) obtaining quaternization of the core-shell particle intermediate with a tertiary amine compound to obtain a insoluble core-shell cationic polymeric particle.

Following Step (D), residual tertiary amine can be removed by vacuum distillation. Following Step (D) and removal of tertiary amine, the insoluble core-shell cationic polymeric particle is preferably purified by diafiltration to remove excess sodium chloride. In the preferred embodiment, in Step (C), poly(vinyl alcohol) is derivatized with dialkyl amino benzaldehyde to form a derivatized poly(vinyl alcohol) comprising an acetal group, wherein the alkyl group comprises 1 to 6 carbon atoms. The reaction can occur at multiple sites in the latex, resulting in a distribution of reactive sites in latex polymers, which may vary from 0 to 1 to 2 and higher. The stoichiometry of the reaction in Step C is preferably controlled so that one acetal function per poly(vinyl alcohol) chain has the highest probability. A Poisson distribution suggests the following distribution for the case where the stoichiometry is controlled so that there is one acetal function per poly(vinyl alcohol) chain on average.

| Attachments per chain | Fraction of total |
|---|---|
| 0 | 1/e = 0.368 |
| 1 | 1/e = 0.368 |
| 2 | 1/2e = 0.184 |
| >2 | 1 − 2.5/e = 0.08 |

In one embodiment of Step (B) above, the formation of the linking-group-containing polymer can be represented, for example, by the following reaction:

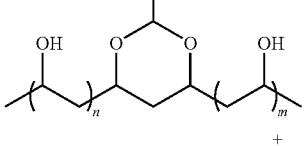

One amine function per poly(vinyl alcohol) chain is desired. Of course, the present invention is not limited to poly(vinyl alcohol) or the particular linking agent exemplified in this reaction.

In one embodiment, the overall reaction scheme for making a cationic core-shell polymeric particle can be represented, for example, as follows:

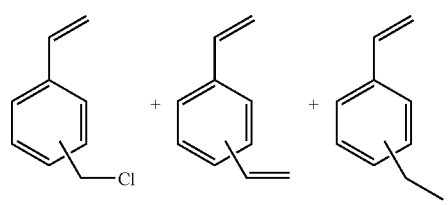

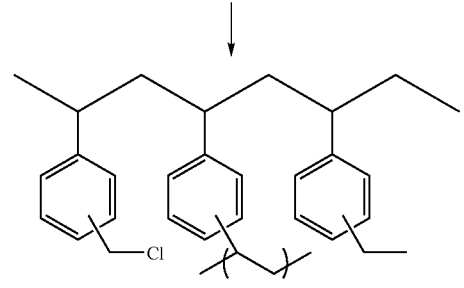

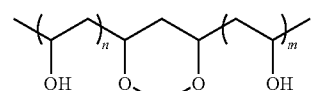

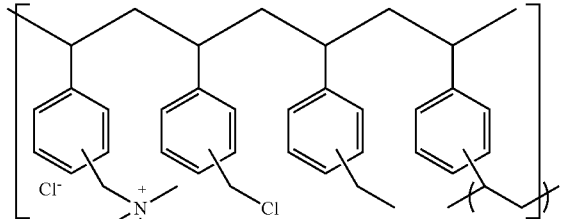

-continued

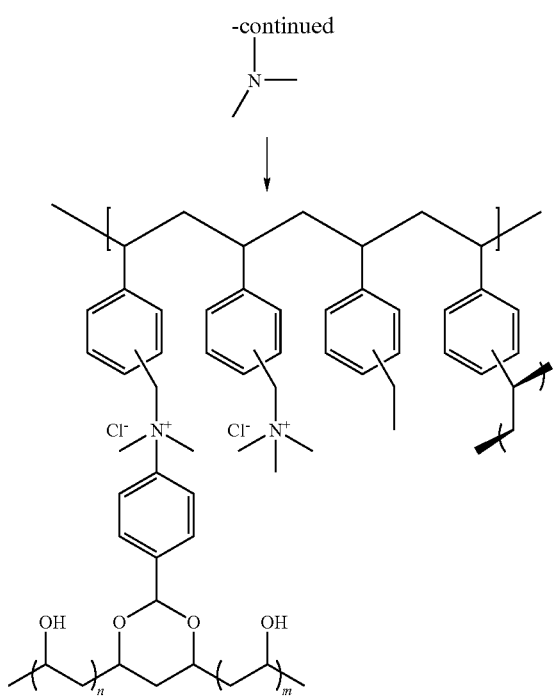

In a preferred embodiment, insoluble cationic core-shell polymeric particles are formed, each comprising a core and shell, a core comprising crosslinked cationic precursor polymer having at least 10 mole percent of a cationic mordant monomeric unit and a shell comprising hydrophilic linking-group-containing polymer, wherein the shell is at least 10% by weight of the core, wherein the linking-group-containing polymer is linked to the precursor polymer through a linking group between the precursor polymer and linking-group-containing polymer comprising an amine group relatively closer to the core and an acetal group relatively closer to the shell.

As mentioned above, the present core-shell particles have various useful applications, as known to the skilled artisan in various fields, such as media, coatings, paints, inks, drug delivery, slow-release materials, etc. One preferred application is for use as mordants in inkjet media. In that case, the amount of the water-insoluble core-shell particles in the image-receiving layer of inkjet media should be high enough so that the images printed on the recording element will have a sufficiently high density, but low enough so that the interconnected pore structure formed by the aggregates is not unduly filled or blocked which might cause coalescence. The mordant polymer described above may be used in any amount effective for the intended purpose. In general, good results have been obtained when the mordant polymer is present in an amount of about 5% to about 25% by weight of the top layer, preferably about 10%. In a preferred embodiment of the invention, the inorganic particles are present in an amount from about 10 to about 95 weight % of the image-recording layer, and the water-insoluble core-shell particles are present in an amount of from about 5 to about 30 weight %.

The addition of the mordant to the overcoat layer does not degrade or unduly degrade other performance features such as dry time, coalescence, bleeding, and adhesion of the layers, water fastness, when printed with a variety of inkjet inks. Organic or inorganic particles can also be present in the amount of greater than fifty percent by weight, preferably between 60 and 95 percent by weight, of the image-receiving layer. The weight ratio of the insoluble cationic core-shell polymeric particles to the total amount of inorganic/organic particles in the image-receiving layer is preferably 1:2 to 1:20, preferably 1:3 to 1:10.

Many types of inorganic particles are manufactured by various methods and commercially available for use in an image-receiving layer, which can provide porosity in the image-receiving layer in order to obtain very fast ink drying. The pores formed between the inorganic particles must be sufficiently large and interconnected so that the printing ink passes quickly through the layer and away from the outer surface to give the impression of fast drying. At the same time, the particles must be arranged in such a way so that the pores formed between them are sufficiently small so that they do not scatter visible light.

In a preferred embodiment of the invention, the ink-retaining layer is a continuous, co-extensive porous layer that contains organic or inorganic particles. Examples of organic particles which may be used include core/shell particles such as those disclosed in U.S. Pat. No. 6,492,006, and homogeneous particles such as those disclosed in U.S. Pat. No. 6,475,602, the disclosures of which are hereby incorporated by reference. Examples of organic particles which may be used include acrylic resins, styrenic resins, cellulose derivatives, polyvinyl resins, ethylene-allyl copolymers and polycondensation polymers such as polyesters.

Examples of inorganic particles useful in the invention include alumina, hydrated alumina such as boehmite, silica, titanium dioxide, zirconium dioxide, clay, calcium carbonate, inorganic silicates or barium sulfate. The particles may be porous or nonporous, colloidal or aggregated. In one embodiment of the invention, the inorganic particles are metallic oxides, preferably fumed. Preferred examples of fumed metallic oxides which may be used include silica and alumina fumed oxides. Fumed oxides are available in dry form or as dispersions of the aggregates. Typically, a porous image-receiving layer also contains a polymeric binder in an amount insufficient to alter the porosity of the porous receiving layer. In another preferred embodiment, the polymeric binder is a hydrophilic polymer such as poly(vinyl alcohol), poly(vinyl pyrrolidone), gelatin, cellulose ethers, poly(oxazolines), poly(vinylacetamides), partially hydrolyzed poly(vinyl acetate/vinyl alcohol), poly(acrylic acid), poly(acrylamide), poly(alkylene oxide), sulfonated or phosphated polyesters and polystyrenes, casein, zein, albumin, chitin, chitosan, dextran, pectin, collagen derivatives, collodian, agar-agar, arrowroot, guar, carrageenan, tragacanth, xanthan, rhamsan and the like. In still another preferred embodiment of the invention, the hydrophilic polymer is poly(vinyl alcohol), hydroxypropyl cellulose, hydroxyethyl cellulose, hydroxypropyl methyl cellulose, gelatin, or a poly(alkylene oxide). In yet still another preferred embodiment, the hydrophilic binder is poly(vinyl alcohol). The polymeric binder should be chosen so that it is compatible with the particles.

The amount of binder used should be sufficient to impart cohesive strength to the ink jet recording element, but should also be minimized so that the interconnected pore structure formed by the aggregates is not filled in by the binder. In a preferred embodiment of the invention, the binder is present in an amount of from about 3 to about 20 weight %.

The thickness of the image-receiving layer may range from about 0.5 to about 50 μm, preferably from about 1 to about 40 μm. The coating thickness required is determined through the need for the coating to act as a sump for absorption of ink solvent and the need to hold the ink near the coating surface.

In a preferred embodiment, the recording element also contains a base layer having at least about 50% by weight of inorganic particles, preferably at least 70 percent by weight. The base layer is coated between the support and the image-receiving layer. Inkjet receivers that can comprise the core-shell particles of the present invention are further disclosed in commonly assigned US Publication No. 2008/0160228 hereby incorporated by reference.

Compositions according to the present invention can comprise other optional ingredients, for example in the case of coatings, the composition may further comprise UV absorbers, radical quenchers or antioxidants, pH modifiers, adhesion promoters, rheology modifiers, surfactants, biocides, lubricants, dyes, optical brighteners, matte agents, antistatic agents, etc. In order to obtain adequate coatability, additives known to those familiar with such art such as surfactants, defoamers, alcohol and the like may be used. A common level for coating aids is 0.01 to 0.30% active coating aid based on the total solution weight. These coating aids can be nonionic, anionic, cationic or amphoteric. Specific examples are described in MCCUTCHEON's Volume 1: Emulsifiers and Detergents, 1995, North American Edition.

The coating composition can be coated either from water or organic solvents, however water is preferred. The total solids content can be selected to yield a useful coating thickness in the most economical way, and for particulate coating formulations, solids contents from 10-40% are typical.

EXAMPLES

Preparation of the Core Polymer Intermediate 1 (PI-1)

A mixture of monomers consisting of 292 g vinyl benzyl chloride (mixed isomers, Dow Chemical) and 34.2 g divinyl benzene (55% assay, mixed isomers Dow Chemical) were emulsified in 296 g demineralized water and 42 g Rhodapon® UB (29% sodium lauryl sulfate, Rhodia Inc.) and 0.57 g sodium metabisulfite. The emulsion was maintained by continual stirring.

The polymerization reaction was carried out as follows. Demineralized water (990 g) and 13.9 g Rhodapon UB were added to a 2 L reactor previously flushed with nitrogen and heated to 60° C. When the reactor reached 60° C., 0.16 g sodium metabisulfite and 2.2 g sodium persulfate were added. The monomer emulsion was then added continuously over a four hour time period. The reactor was held at 60° C. for an additional four hours and then cooled to 25° C. The particle size of the latex was 60 nm.

Preparation of the Core Polymer Intermediate 2 (PI-2)

A mixture of monomers consisting of 292 g vinyl benzyl chloride (mixed isomers, Dow Chemical) and 34.2 g divinyl benzene (55% assay, mixed isomers Dow Chemical) was emulsified in 296 g demineralized water and 16.7 g Rhodapon® UB (29% sodium lauryl sulfate, Rhodia Inc.) and 0.57 g sodium metabisulfite. The emulsion was maintained by continual stirring.

Polymerization of the monomer mixture was carried out as follows. Demineralized water (990 g) and 6.6 g Rhodapon UB were added to a 2L reactor previously flushed with nitrogen and heated to 60° C. When the reactor reached 60° C., 0.16 g sodium metabisulfite and 2.2 g sodium persulfate were added. The monomer emulsion was then added continuously over a four hour time period. The reactor was held at 60° C. for an additional four hours and then cooled to 25° C. The particle size of the latex was 110 nm, which was larger than that of the core polymer intermediate PI-1, as a result of less surfactant being employed in the emulsion polymerization.

Preparation of Comparative Mordant (Non-Core-Shell) Polymer Particle 1 (CP-1)

Preparation of a comparative mordant polymer particle, without a shell, was carried out by quaternization of core polymer PI-1, in which 500 g of PI-1 were quaternized by adding 111 g of trimethylamine (25% aq., Aldrich). During the trimethylamine addition it was necessary to increase the stirring as the reaction mixture thickened and then reduce it again when the mixture thinned. After the quaternization was complete, residual trimethyl amine was removed by raising the pH of the mixture to 12 and distilling the mixture under vacuum at approximately 65° C. for three hours.

The resulting sample was 12.4% solids as determined by gravimetric analysis, had less than 1 μg/g residual trimethylamine as determined by ion chromatography, had median particle size of 91 nm as determined by UPA, had a pH of 3.6, and was determined by silver nitrate titration to be 80.6 weight % vinylbenzyltrimethylammonium chloride. The zeta potential at pH 4 was 36.2 mV, at pH 7 was 36.4 mV, at pH 10 was 30.4 mV.

The zeta potential of a dispersed particle is defined as the electrostatic potential generated at the junction of the rigidly attached Stern layer and the weakly associated diffuse layer and is stated in the units of millivolts.

The zeta potential of a particle can be calculated, knowing the electrophoretic mobility of the sample, by Henry's Equation:

$$U_e = \frac{2\varepsilon \zeta f(ka)}{3\eta}$$

Where $U_e$ is the electrophoretic mobility, $\in$ is the dielectric constant of the sample, $\zeta$ is the zeta potential, f(ka) is Henry's Function, and $\eta$ is the viscosity of the solvent. Usually, electrophoretic analysis is made in aqueous media for which f(ka) takes the value 1.5. This value is used in the Smoluchowski approximation to yield:

$$\mu_e = \in \zeta / \eta$$

Classically, if the absolute value of the zeta potential is greater than 30 mV the particles will repel each other during collisions due to thermal motion. If the absolute value of the zeta potential is less than 30 mV, the collisions will result in flocculation and destabilization.

The electrophoretic mobility for these samples was quantified using a Malvern Instruments Zetasizer Nano ZS. The instrument utilizes Laser Doppler Velocimetry where an electrical field of known strength is applied across the sample, through which a laser is then passed. The electrophoretic mobility of the colloid will dictate the velocity with which the charged particles move which will then induce a frequency shift in the incident laser beam. Using the Smoluchowski approximation for Henry's Function, the dielectric constant of the sample, the viscosity of the solvent and the measured electrophoretic mobility, the zeta potential of the particles for the samples was calculated.

Preparation of Comparative Mordant (Non-Core-Shell) Polymer Particle 2 (CP-2).

A comparative mordant polymer particle, without a shell was carried out by quaternization of core polymer PI-1, in which 500 g of CPI-2 were customized by adding 111 g of trimethylamine (25% aq., Aldrich). During the trimethylamine addition it was necessary to increase the stirring as the reaction mixture thickened and then reduce it again when the mixture thinned.

After the quaternization was complete, residual trimethyl amine was removed by raising the pH of the mixture to 12 and distilling the mixture under vacuum at approximately 65° C. for three hours.

The resulting sample was 13.1% solids as determined by gravimetric analysis, had less than 1 μg/g residual trimethylamine as determined by ion chromatography, had median particle size of 166 nm, larger than CP-1, as determined by UPA, had a pH of 2.7, and was determined by silver nitrate titration to be 81.0 weight % vinylbenzyltrimethylammonium chloride. The zeta potential at pH 4 was 33.9 mV, at pH 7 was 35.2 mV, and at pH 10 it was 24 mV.

Preparation of Linking-Group-Containing Shell Polymer 1 (SP-1)

A linking-group-containing shell polymer was prepared by dissolving 200 g of CELVOL 203 (88% hydrolyzed polyvinyl alcohol, estimated number average molecular weight 13,200, 0.015 moles, Celanese Inc.) in 800 g of water by heating to 90° C. and holding for one hour. The mixture was cooled to 60° C. 2.26 g (0.015 moles) of 4-dimethylaminobenzaldehyde and 6 mL of concentrated HCl were added to the solution and allowed to react overnight.

Preparation of Linking-Group-Containing Shell Polymer 2 (SP-2)

A linking-group-containing shell polymer was prepared by dissolving 200 g of Nippon Gohsei NK-05 (73% hydrolyzed, estimated number average molecular weight 15,400, 0.013 moles) in 800 g demineralized water by heating to 70° C. and holding for one hour. The mixture was then cooled to 60° C. and 2.64 g (0.0175 moles) of 4-dimethylaminobenzaldehyde and 6 mL of concentrated HCl were added to the solution and allowed to react overnight.

Preparation of Linking-Group-Containing Shell Polymer 3 (SP-3)

A linking-group-containing shell polymer was prepared by dissolving 300 g of CELVOL 103 in 1200 g demineralized water by heating to 95° C. and holding for one hour. The mixture was then cooled to 60° C. and 3.39 g of 4-dimethylaminobenzaldehyde and 9 mL of concentrated HCl were added to the solution and allowed to react over night. Table 2 shows the characterization of the shell polymers by NMR. These data indicate that the reaction of the aldehyde with the polyvinyl alcohol is nearly quantitative with a minimum of 88% of the aldehyde being converted to acetal. Additionally, the mole percent acetal data indicate that on average there is approximately one acetal function per polyvinyl alcohol molecule.

TABLE 1

| Shell Polymer | Mole % vinyl alcohol | Mole % Acetate | Mole % Acetal | Unincorporated Aldehyde % of Total Aldehyde |
|---|---|---|---|---|
| SP-1 | 89 | 11 | 0.34 | 2 |
| SP-2 | 75 | 24 | 0.46 | 5 |
| SP-3 | 99 | 1.1 | 0.30 | 12 |

The results in Table 1 show a high yield of shell polymer with one or more acetal linking groups (1 to 2 linkages per polyvinyl alcohol polymer on average, as calculated based on NMR spectroscopy.

The following Examples of core-shell particles according to the present examples show the effect of differing amounts of shell polymer relative to the same core polymer.

Preparation of Core-Shell Particle 2 (PE-2)

Another core-shell polymer according to the present invention, was prepared by combining 300 g of SP-1 with 600 g of demineralized water and adjusting the pH to 10 with sodium hydroxide. The mixture was combined with 100 grams of CPI-2 and stirred for 30 minutes. Then, 22.14 g of trimethylamine (25% aq.) were added and allowed to stir for one hour. After one hour, the pH was raised to 12 and the mixture was vacuum distilled for 3 hours to remove residual trimethylamine.

Preparation of Core-Shell Particle 3 (PE-3)

Another core-shell polymer, according to the present invention, was prepared by combining 300 g of SP-1 with 500 g of demineralized water and adjusting the pH to 10 with sodium hydroxide. The mixture was combined with 200 g of CPI-2 and stirred for 30 minutes. 44.28 g of trimethylamine (25% aq.) were added and allowed to stir for one hour. After one hour, the pH was raised to 12 and the mixture was vacuum distilled for 3 hours to remove residual trimethylamine.

Preparation of Core-Shell Particle 4 (PE-4)

Another core-shell polymer, according to the present invention, was prepared by combining 200 g of SP-1 with 533 g of demineralized water and adjusting the pH to 10 with sodium hydroxide. The mixture was combined with 267 g of CPI-2 and stirred for 30 minutes. 59.1 g of trimethylamine (25% aq.) were added and allowed to stir for one hour. After one hour, the pH was raised to 12 and the mixture was vacuum distilled for 3 hours to remove residual trimethylamine.

Table 2 below shows a comparison of preparative examples PE-2, PE-3, and PE-4 representing a cationic core-shell particle with comparative example CE-2 representing a cationic particle

TABLE 2

| Cationic Particle Example | Weight Ratio of Shell to Core | Median Particle Size μm | Wt % Quaternary Ammonium Salt | Zeta Potential at pH 4 | Zeta Potential at pH 7 | Zeta Potential at pH 10 |
|---|---|---|---|---|---|---|
| Comparative CE-2 | 0:1 | 0.166 | 81 | 33.9 | 35.2 | 24 |
| Example PE-2 | 2.8:1 | 0.282 | 29.2 | 5.5 | 7.8 | 4.8 |
| Example PE-3 | 2:1 | 0.247 | 40.4 | 8.4 | 9.3 | 7.3 |
| Example PE-4 | 1.5:1 | 0.213 | 53.9 | 11.5 | 13.5 | 11.8 |

The weight percent of quaternary ammonium salt, with respect to the total weight of the particles, was calculated using ionic chloride concentrations determined by silver nitrate titration. The ionic species was assumed to be vinyl benzyl trimethyl ammonium chloride. The zeta potentials were determined as described above. The zeta potential data show that the reduction in zeta potential is proportional to amount of shell polymer. The particle size results show that as the proportion of shell polymer in the particle increases so does the median particle size.

Preparation of Core-Shell Particle 5 (PE-5)

Another core-shell polymer, according to the present invention, was prepared by combining 600 g of SP-1 with 600 g of demineralized water and adjusting the pH to 10 with sodium hydroxide. The mixture was combined with 200 g of CPI-1 and stirred for 30 minutes. 44.3 g of trimethylamine (25% aq.) were added and allowed to stir for one hour. After one hour, the pH was raised to 12 and the mixture was vacuum distilled for 3 hours to remove residual trimethylamine.

polymer other than SP-1 or SP-3) with 600 g of demineralized water and adjusting the pH to 10 with sodium hydroxide. The mixture was combined with 200 g of CPI-1 and stirred for 30 minutes. 44.3 g of trimethylamine (25% aq.) were added and allowed to stir for one hour. After one hour, the pH was raised to 12 and the mixture was vacuum distilled for 3 hours to remove residual trimethylamine.

Preparation of Core-Shell Particle 10 (PE-10)

Another core-shell polymer, according to the present invention, was prepared by combining 350 g of SP-2 with 466 g of demineralized water and adjusting the pH to 10 with sodium hydroxide. The mixture was combined with 467 g of CPI-1 and stirred for 30 minutes. 100.8 g of trimethylamine (25% aq.) were added and allowed to stir for one hour. After one hour, the pH was raised to 12 and the mixture was vacuum distilled for 3 hours to remove residual trimethylamine.

Table 3 below shows a comparison of Core-Shell Particles PE-5 to PE-10 with Comparative Example CE-1

TABLE 3

| Example | Weight Ratio Shell to Core | Shell Polymer | Median Particle Size μm | Wt % Quaternary Ammonium Salt | Zeta Potential at pH 4 | Zeta Potential at pH 7 | Zeta Potential at pH 10 |
|---|---|---|---|---|---|---|---|
| CE-1 | 0:1 | None | 0.091 | 80.6 | 36.2 | 36.4 | 30.4 |
| PE-5 | 2.8:1 | SP-1 | 0.123 | 28.8 | 2.9 | 0.6 | 0.4 |
| PE-6 | 1.6:1 | SP-1 | 0.119 | 51.9 | 5.6 | 2.5 | 4.1 |
| PE-7 | 2.4:1 | SP-3 |  | 33.3 | 2.1 | 0.2 | 0.5 |
| PE-8 | 1.5:1 | SP-3 |  | 55.3 | 5.2 | 1.8 | 3.0 |
| PE-9 | 2.7:1 | SP-2 | 0.137 | 30.2 | 0.6 | −0.5 | 0.4 |
| PE-10 | 1.5:1 | SP-2 | 0.128 | 52.4 | 3.4 | 1.3 | 2.4 |

Preparation of Core-Shell Particle 6 (PE-6)

Another core-shell polymer, according to the present invention, was prepared by combining 400 g of SP-1 with 533 g of demineralized water and adjusting the pH to 10 with sodium hydroxide. The mixture was combined with 534 g of CPI-1 and stirred for 30 minutes. 118.2 g of trimethylamine (25% aq.) were added and allowed to stir for one hour. After one hour, the pH was raised to 12 and the mixture was vacuum distilled for 3 hours to remove residual trimethylamine.

Preparation of Core-Shell Particle 7 (PE-7)

Another core-shell polymer, according to the present invention, was prepared by combining 600 g of SP-3 (a shell polymer other than SP-1) with 600 g of demineralized water and adjusting the pH to 10 with sodium hydroxide. The mixture was combined with 200 g of CPI-1 and stirred for 30 minutes. 44.3 g of trimethylamine (25% aq.) were added and allowed to stir for one hour. After one hour, the pH was raised to 12 and the mixture was vacuum distilled for 3 hours to remove residual trimethylamine.

Preparation of Core-Shell Particle 8 (PE-8)

Another core-shell polymer, according to the present invention, was prepared by combining 350 g of SP-3 with 466 g of demineralized water and adjusting the pH to 10 with sodium hydroxide. The mixture was combined with 467 g of CPI-1 and stirred for 30 minutes. 100.8 g of trimethylamine (25% aq.) were added and allowed to stir for one hour. After one hour, the pH was raised to 12 and the mixture was vacuum distilled for 3 hours to remove residual trimethylamine.

Preparation of Core-Shell Particle 9 (PE-9)

Another core-shell polymer, according to the present invention, was prepared by combining 600 g of SP-2 (a shell The results in Table 3 confirm that as the amount of shell polymer is increased the median particle size also increases. This is evidence that the shell polymer is reacting with the core to form a larger shelled particle. The zeta potential data shows that as the amount of shell polymer increases the zeta potential decreases, which is an indication of shielding of the cationic core by the nonionic shell.

Comparative Example 1

Coating Comparative Receiver Element CR-1

A multilayer inkjet receiver was prepared as follows. A coating composition for a base layer was prepared by mixing 0.335 dry g of COLLOID 211 sodium polyacrylate (Kemira Chemicals) as a 43% solution with 145 g of water. To the mixture was added 25.44 dry g of silica gel (IJ-624, Crosfield Ltd.) while stirring, 148.3 dry g of precipitated calcium carbonate (ALBAGLOSS-S, Specialty Minerals Inc.) as a 69% solution, 4.09 dry g of a polyvinyl alcohol (CELVOL 325, Air Products and Chemicals Inc.) as a 10% solution, an additional 22.89 dry g of silica gel (IJ-624, Crossfield Ltd.), and 25 dry g of styrene-butadiene latex (CP692NA, Dow Chemicals) as a 50% solution. The silica gel was added in two parts to avoid gelation.

Accordingly, the base layer coating composition was made up of the sodium polyacrylate, silica gel, precipitated calcium carbonate, polyvinyl alcohol, and styrene-butadiene latex in a weight ratio of 0.15:21.30:65.45:1.80:11.30 at 45% solids.

The base layer coating composition was rod-coated on a base paper, basis weight 179 g/m$^2$, and dried by forced air. The thickness of the dry base coating was 30 μm and its weight was 32.3 g/m$^2$.

A coating composition for the intermediate layer was prepared by combining hydrated alumina (CATAPAL 200, Sasol Corp.), poly(vinyl alcohol) (GOHSENOL GH-23, Nippon Gohsei Co.), CARTABOND GH (Clariant Corp.) glyoxal crosslinker and boric acid in a ratio of 95.38:4.25:0.25:0.13, to give an aqueous coating formulation of 33% solids by weight.

A coating composition for the upper layer was prepared by combining hydrated alumina (DISPAL 14N4-80, Condea Vista Co.), fumed alumina (CAB-O-SPERSE PG003, Cabot Corp.), polyvinyl alcohol (GOHSENOL GH-23, Nippon Gohsei Co.), comparative cationic mordant particles CE-1 as prepared above, CARTABOND GH glyoxal (Clariant Corp.) and boric acid in a ratio of 36.4:41.58:5.23:15.72:0.25:0.13 to give an aqueous coating formulation of 21% solids by weight. Surfactants ZONYL FSN (DuPont Co.) and OLIN 10G (Olin Corp.) were added in small amounts as coating aids.

The intermediate and upper layer coating compositions were bead coated on top of the base layer. The coating was then dried by forced air to yield a three-layer recording element. The thickness of the mid-layer was 35 μm or 37.7 g/m$^2$. The thickness of the overcoat-layer was 2 μm or 2.15 g/m$^2$. The coated material was calendered at a pressure of 700 pli, including two passes through the nip.

Comparative Example 2

A multilayer inkjet receiver Comparative Element CR-2, was prepared the same way as element C-1, except the cationic mordant was replaced with CE-2.

Comparative Example 3

A multilayer inkjet receiver Comparative Element CR-3, was prepared the same way as element C-1, except the cationic mordant was increased by 50%.

Example 1

A multilayer inkjet receiver Element R-1, according to the present invention, was prepared the same way as element C-1, except the polyvinyl alcohol and cationic mordant were replaced with PE-2, where the cationic content was kept equivalent.

Example 2

A multilayer inkjet receiver Element R-2, according to the present invention, was prepared the same way as element C-1, except the polyvinyl alcohol and cationic mordant were replaced with PE-3, where the cationic content was kept equivalent.

Example 3

A multilayer inkjet receiver Element R-3, according to the present invention, was prepared the same way as element C-1, except the polyvinyl alcohol and cationic mordant were replaced with PE-4, where the cationic content was kept equivalent.

Example 4

A multilayer inkjet receiver Element R-4, according to the present invention, was prepared the same way as element C-1, except the polyvinyl alcohol and cationic mordant were replaced with PE-5, where the cationic content was kept equivalent.

Example 5

A multilayer inkjet receiver Element R-5, according to the present invention, was prepared the same way as element C-1, except the polyvinyl alcohol and cationic mordant were replaced with PE-5, where the cationic content was increased by 50%.

Example 6

A multilayer inkjet receiver Element R-6, according to the present invention, was prepared the same way as element C-1, except the polyvinyl alcohol and cationic mordant were replaced with PE-6, where the cationic content was kept equivalent.

Example 7

A multilayer inkjet receiver Element R-7, according to the present invention, was prepared the same way as element C-1, except the polyvinyl alcohol and cationic mordant were replaced with PE-6, where the cationic content was increased by 50%.

Example 8

A multilayer inkjet receiver Element R-8, according to the present invention, was prepared the same way as element C-1, except the polyvinyl alcohol and cationic mordant were replaced with PE-7, where the cationic content was kept equivalent.

Example 9

A multilayer inkjet receiver Element R-9, according to the present invention, was prepared the same way as element C-1, except the polyvinyl alcohol and cationic mordant were replaced with PE-7, where the cationic content was increased by 50%.

Example 10

A multilayer inkjet receiver Element R-10, according to the present invention, was prepared the same way as element C-1, except the polyvinyl alcohol and cationic mordant were replaced with PE-8, where the cationic content was kept equivalent.

Example 11

A multilayer inkjet receiver Element R-11, according to the present invention, was prepared the same way as element C-1, except the polyvinyl alcohol and cationic mordant were replaced with PE-8, where the cationic content was increased by 50%.

Example 12

A multilayer inkjet receiver Element R-1, according to the present invention, was prepared the same way as element C-1, except the polyvinyl alcohol and cationic mordant were replaced with PE-9, where the cationic content was kept equivalent.

Example 13

A multilayer inkjet receiver Element R-13, according to the present invention, was prepared the same way as element C-1, except the polyvinyl alcohol and cationic mordant were replaced with PE-9, where the cationic content was increased by 50%.

Example 14

A multilayer inkjet receiver Element R-14, according to the present invention, was prepared the same way as element C-1, except the polyvinyl alcohol and cationic mordant were replaced with PE-10, where the cationic content was kept equivalent.

Example 15

A multilayer inkjet receiver Element R-16, according to the present invention, was prepared the same way as element C-1, except the polyvinyl alcohol and cationic mordant were replaced with PE-10, where the cationic content was increased by 50%.

Experimental Testing of Fade Density

Dye fade was evaluated by printing a test target of uniform density patches on test samples with a Hewlett Packard Model 6540 inkjet printer. After printing the densities were read with a SPECTROLINO Spectroscan T densitometer manufactured by Greytag Macbeth. The test samples were then placed into a 60 ppb ozone chamber and held there for seven days. After removal, the densities of the test strips were reread, and the percent fade at an optical density of 1.0 was interpolated from the fade data.

The results of testing of Comparative Element C-1, Element 1, and Element 2 comprising fade and density results are shown in Tables 4 and 5 below.

TABLE 4

| Element | Shell Polymer And Weight Ratio of Shell to Core | Particle Size | Mordant Level (equivalents) | % Magenta Fade From Density 1.0 7 days 60 ppb $O_3$ | % Cyan Fade From Density 1.0 7 days 60 ppb $O_3$ | % Black Fade From Density 1.0 7 days 60 ppb $O_3$ |
|---|---|---|---|---|---|---|
| C-1 | None | 0.091 | 1 | 28.3 | 23.9 | 19.2 |
| C-2 | None | 0.166 | 1 | 25.5 | 24.2 | 19.3 |
| R-1 | SP-1 | 0.282 | 1 | 19.0 | 19.5 | 16.5 |
| R-2 | SP-1 | 0.247 | 1 | 23.0 | 20.3 | 17.3 |
| R-3 | SP-1 | 0.213 | 1 | 23.1 | 20.9 | 18.0 |

The results in Table 4 show core shell particles with cationic mordanting cores and nonionic polyvinyl alcohol shells reduce the amount of dye fade that results from the exposure of test prints to high concentrations of ozone.

TABLE 5

| Example | Weight Ratio Shell to Core | Shell Polymer | Median Particle Size μm | Mordant Level (equivalents) | % Magenta Fade From Density 1.0 7 days 60 ppb $O_3$ | % Cyan Fade From Density 1.0 7 days 60 ppb $O_3$ | % Black Fade From Density 1.0 7 days 60 ppb $O_3$ |
|---|---|---|---|---|---|---|---|
| C-1 | 0:1 | None | 0.091 | 1 | 61.8 | 42.1 | 36.4 |
| C-3 | 0:1 | None | 0.091 | 1.5 | 56.9 | 39.5 | 34.0 |
| R-4 | 2.8:1 | SP-1 | 0.123 | 1 | 43.5 | 34.4 | 28.4 |
| R-5 | 2.8:1 | SP-1 | 0.123 | 1.5 | 43.1 | 32.3 | 26.0 |
| R-6 | 1.6:1 | SP-1 | 0.119 | 1 | 56.2 | 40.6 | 31.8 |
| R-7 | 1.6:1 | SP-1 | 0.119 | 1.5 | 39.3 | 29.2 | 24.7 |
| R-8 | 2.4:1 | SP-3 | | 1 | 37.2 | 28.5 | 23.0 |
| R-9 | 2.4:1 | SP-3 | | 1.5 | 24.9 | 17.3 | 10.0 |
| R-10 | 1.5:1 | SP-3 | | 1 | 43.1 | 33.1 | 26.7 |
| R-11 | 1.5:1 | SP-3 | | 1.5 | 39.3 | 29.2 | 24.7 |
| R-12 | 2.7:1 | SP-2 | 0.137 | 1 | 33.9 | 28.6 | 22.5 |
| R-13 | 2.7:1 | SP-2 | 0.137 | 1.5 | 23.2 | 27.2 | 17.1 |
| R-14 | 1.5:1 | SP-2 | 0.128 | 1 | 52.8 | 36.4 | 29.1 |
| R-15 | 1.5:1 | SP-2 | 0.128 | 1.5 | 45.0 | 30.7 | 24.8 |

All of the invention examples in Table 5 show reduced dye fade in comparison with the Example C-1. In general, the amount of protection increases as the shell thickness increases, and it also increases as the amount of core shell mordant is increased. The improvements are observed with all three shell polymer compositions.

The invention has been described in detail with particular reference to certain preferred embodiments thereof, but it will be understood that variations and modifications can be effected within the spirit and scope of the invention.

What is claimed is:

1. A method of making core-shell polymer particles comprising the following steps:
    (a) forming a precursor polymer from a reaction mixture of monomers, including a monomer comprising a precursor group that can be converted to an amine or a quaternary ammonium group;
    (b) forming a linking-group-containing polymer by derivatizing a hydroxy-group-containing polymer comprising hydroxy groups on adjacent carbon atoms with a linking agent that is a compound comprising both an aldehyde moiety and an amine moiety, wherein one or more acetal moieties are formed in the linking-group-containing polymer, each acetal formed by the reaction of the aldehyde moiety in the linking agent with two hydroxy groups in the linking-group-containing polymer, wherein the amine moiety then becomes a linking group pendant from the linking-group-containing polymer, wherein the linking group is capable of reacting with the precursor group in the precursor polymer; and
    (c) reacting the amine moiety in the linking-group-containing polymer with the precursor group in the precursor polymer to form a higher order amine or quaternized ammonium moiety connecting the linking-group-containing polymer to the precursor polymer, thereby creating a core-shell particle which may optionally comprise unreacted precursor groups, wherein a first of said two polymers, either the precursor polymer or the linking-group-containing polymer, is a latex comprising a water insoluble polymer, wherein the latex forms a core for the core-shell particle and the second of said two polymers forms a shell.

2. The method of claim 1 wherein after step (c) the core-shell particle is reacted with a tertiary amine compound not a polymer to obtain quaternization of unreacted precursor groups in the precursor polymer in the core-shell particle, thereby forming insoluble cationic core-shell polymeric particles, comprising quaternary ammonium groups having further cationic charge in addition to connecting moieties.

3. The method of claim 1 wherein the precursor polymer forms a core of the insoluble cationic core-shell polymeric particles and the linking-group-containing polymer forms the shell.

4. The method of claim 3 wherein at least the core or precursor polymer is cationic.

5. The method of claim 1 wherein the precursor polymer forms the shell of the core-shell polymer particles and the linking group-containing polymer forms the core.

6. The method of claim 5 wherein at least the shell polymer is cationic.

7. The method of claim 1 wherein the core and the shell are independently neutral, anionic, or cationic in net charge.

8. The method of claim 1 wherein either one of the core or the shell is cationic in net charge and the other one of the core or the shell is essentially non-charged other than at connection moieties.

9. The method of claim 1, wherein the linking-group-containing polymer comprises on average approximately one linking group per linking-group-containing polymer molecule.

10. The method of claim 1, wherein the core-shell particle created in step (c) comprises a core comprising crosslinked core polymer and a shell comprising hydrophilic shell polymer, wherein the shell is at least 10% by weight of the core, and wherein the hydrophilic shell polymer is linked to the core polymer through a linking group between the core polymer and the hydrophilic shell polymer, comprising an amine group relatively closer to the core and an acetal group relatively closer to the shell.

11. The method of claim 10, wherein the core of the core-shell particle created in step (c) is cationic, having at least 10 mole percent of a cationic mordant monomeric unit, and the hydrophilic shell polymer is substantially less cationic than the crosslinked core polymer.

12. The method of claim 11, wherein the hydrophilic shell polymer of the core-shell particle created in step (c) is at least 50 percent less cationic than the crosslinked core polymer, in terms of number of cationic groups per weight average molecular weight of the polymer.

13. The method of claim 11, wherein cationic groups are essentially absent from the hydrophilic shell polymer of the core-shell particle created in step (c).

14. The method of claim 11, wherein the amine linking group is attached to the crosslinked core polymer of the core-shell particle created in step (c) at a monomeric location in the core polymer elsewhere occupied by a quaternary amine group.

15. The method of claim 11, wherein the crosslinked core polymer of the core-shell particle created in step (c) comprises quaternary ammonium salt moieties.

16. The method of claim 11, wherein the crosslinked core polymer of the core-shell particle created in step (c) comprises monomeric units selected from the group consisting of (vinylbenzyl)trialkyl quaternary ammonium salt, (vinylbenzyl)dialkylbenzyl quaternary ammonium salt moiety, and combinations thereof, wherein alkyl groups have 1 to 6 carbon atoms.

17. The method of claim 10, wherein the crosslinked core polymer of the core-shell particle created in step (c) comprises styrenic polymer, acrylic polymer, or polyester polymer.

18. The method of claim 10, wherein the crosslinked core polymer of the core-shell particle created in step (c) comprises between 0.5 and 15 mole percent of a crosslinking monomer.

19. The method of claim 10, wherein the core-shell particles created in step (c) have a mean particle size of from about 10 to about 500 nm.

20. The method of claim 10, wherein the hydrophilic shell polymer of the core-shell particle created in step (c) comprises polyvinyl alcohol or a copolymer or derivative thereof.

21. A method of making a core-shell polymer comprising the following steps:
    (a) forming a polymer latex core intermediate from a reaction mixture of monomers, including a monomer comprising a precursor group that can be converted to a quaternary ammonium group;
    (b) forming a linking-group-containing shell polymer by derivatizing a hydroxy-group-containing polymer with a linking agent that is a compound comprising both an aldehyde moiety and an amine moiety, wherein one or more acetal moieties are formed in the linking-group-containing shell polymer each acetal formed by the reaction of the aldehyde moiety in the linking agent with two hydroxy groups in the hydroxy-group-containing polymer, wherein the amine moiety then becomes a linking group pendent from the linking-group-containing shell polymer, wherein the linking group is capable of reacting with the precursor group in the polymer latex core intermediate;

(c) reacting the linking-group-containing shell polymer with the polymer latex core intermediate prior to quaternization of the precursor group to create a core-shell particle intermediate; and d) obtaining quaternization of the core-shell particle intermediate with a tertiary amine compound to obtain an insoluble core-shell cationic polymeric particle.

22. The method of claim 21 wherein following Step (d), residual tertiary amine is removed by vacuum distillation.

23. The method of claim 22 wherein following Step (d) and removal of tertiary amine, the insoluble core-shell cationic polymeric particle is purified by diafiltration to remove excess salt.

24. The method of claim 22 wherein in step (b), the linking-group-containing shell polymer is formed by derivatizing polyvinyl alcohol with dialkyl amino benzaldehyde to form a derivatized polyvinyl alcohol comprising an acetal group, wherein the alkyl comprises 1 to 6 carbon atoms.

* * * * *